3,029,294
PURIFICATION OF PHENOL
John Alfred Keeble, Banstead, England, assignor, by mesne assignments, to Hercules Powder Company, a corporation of Delaware
No Drawing. Filed Feb. 27, 1959, Ser. No. 795,907
9 Claims. (Cl. 260—621)

The present invention relates to the purification of phenols and in particular to the purification of phenol derived from cumene.

The production of phenol by the oxidation of cumene and the decomposition of the resulting hydroperoxide is well known. The phenol produced in this process can be purified by conventional methods to a degree which satisfies the exacting requirements of the British Standard Specification and of the U.S. Pharmacopeia. However, some samples of highly purified phenol produced in this way, while conforming to these specifications, still contain impurities which cause the development of an undesired colour when the phenol is subjected to chlorination, particularly to the mono- and penta-chlorphenols, or on sulphonation with concentrated sulphuric acid. These impurities are referred to in this specification as "colour forming impurities."

According to the present invention the process for the purification of phenol derived from cumene and containing colour forming impurities including aliphatic α-hydroxy carbonyl compounds comprises subjecting the impure phenol to conditions which will cause the condensation of the aliphatic α-hydroxy carbonyl compounds with phenol to form benzofurans, and separating the phenol from the benzofurans.

The invention is based on the discovery that the undesired colour which develops when the phenol is subjected to chlorination and/or sulphonation is at least partially due to the presence in the phenol of very small quantities of one or more benzofurans, which, under chlorination and/or sulphonation conditions react to give intensely coloured derivatives. It has further been discovered that these benzofurans are formed by the condensation of phenol with various precursors including aliphatic α-hydroxy carbonyl compounds, i.e. compounds of the formula

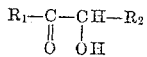

$R_1$ and $R_2$ being hydrogen atoms or alkyl groups. Such compounds include hydroxyacetone (acetol) and acetyl methyl carbinol (acetoin). Thus it is believed that hydroxyacetone condenses with phenol to form 2-methylbenzofuran, while acetoin condenses with phenol to form 2,3-dimethylbenzofuran. Chlorination and/or sulphonation colour can also be caused by the presence in the phenol of condensation products other than benzofurans, which are derived from various precursors including aliphatic α-hydroxy carbonyl compounds, such as hydroxyacetone and acetoin, as well as compounds such as diacetyl and mesityl oxide. It has been found that the conditions which will cause the conversion of alphatic α-hydroxy carbonyl compounds to substituted benzofurans also result in the formation of these other colour-forming condensation products, and in the conversion of the aliphatic α-hydroxy carbonyl compounds in part to impurities which are not colour-forming.

The precursors of these various colour-forming and other impurities are difficultly separable from phenol by ordinary fractional distillation methods; at the temperatures to which the phenol is subjected during fractional distillation operations, the conversion of the precursors takes place to a certain extent in the still itself whilst an appreciable part of the precursors distil over with the phenol, with the result that the phenol fractions obtained are still contaminated. In the process of the present invention the precursors are converted to benzofurans, and other condensation products, and these are all subsequently separated from the phenol.

The starting material for the process of the present invention may be crude phenol, produced by the decomposition of cumene hydroperoxide, or the phenol which has already been purified to a degree which satisfies the requirements of the British Standard Specification and/or the U.S. Pharmacopeia, but which still contains traces of colour-forming impurities which cannot be removed by conventional methods and which may make the phenol unsuitable for certain applications. It is preferred to use as the starting material phenol which has been treated, for instance by fractional distillation of the washed and neutralised decomposition reaction product, for the removal of most of the lower boiling materials, such as acetone, cumene, and α-methylstyrene and/or most of the higher-boiling materials such as acetophenone and phenyl dimethyl carbinol. The phenol may be either in the dry state or it may be diluted with water which enables it to be pumped at ordinary temperatures as a liquid and avoids solidification on cold surfaces.

The treatment of the phenol to convert any α-hydroxy carbonyl compound present to a benzofuran may be carried out by heating the phenol in the liquid or vapour phase to an elevated temperature, for instance at least 40° C., and preferably between 100° and 400° C. The process is carried out in the presence of a catalytically active material such as activated alumina; aluminium silicates, such as acid- or alkali-treated pumice and porcelain; acidic or basic ion-exchange resins; mineral acids such as sulphuric acid and phosphoric acid; strong organic acids, such as p-toluene sulphonic acid; and surface-active earths such as montmorillonites, also known as fuller's earth, bentonite, Florida earth, and attapulgite.

In the case of the vapour phase heat treatment according to the process of the invention, this may be carried out in any suitable manner, for instance by passing the vaporised phenol through an unpacked tube at the desired temperature, but it is preferred to carry out the heat treatment in the presence of a catalytically active material such as those set out above. If desired the heat treatment may be carried out in the presence of catalytically active materials when the lower temperatures in the range set forth are used, and in the absence of such materials at the higher temperatures. Inert diluents may be used if desired. The heat treatment is preferably carried out in the temperature range 182° C. to 400° C. and at atmospheric pressure. Reduced or increased pressures may be employed if desired, and reduced pressures may be particularly suitable where low temperatures, such as 150° C.–182° C. are being used.

In the case of the liquid phase heat treatment according to the process of the invention, it is preferred to use a surface-active earth such as the montmorillonites, also known as fuller's earths, bentonites, Florida earths and attapulgites. They are preferably used in the acid-activated state, although non-acid-activated earths, or earths which have been activated by alkali or heat-treatment may also be used. As examples of such surface-active earths available commercially which are acid-activated may be mentioned the fuller's earths 237 SW, Fulmont 500, Fulmont 711 and Fulmont 800 marketed by the Fullers' Earth Union, Ltd., Redhill, Surrey. Also marketed by the Fullers' Earth Union is Fulbent 182, an alkali-treated earth or bentonite. Surface-active earths which have been activated by heat treatment include Florex XXF (a fuller's earth) marketed by the Floridin Company, U.S.A., Attapulgus 50–248–52A and 50–248–52C (attapulgites) marketed by the Attapulgus Clay Company, U.S.A. Other types of surface-active earths which, when acid treated, may be used are kieselguhr, pumice and talc although these are less effective than the montmorillonites. Active charcoal is also an effective catalyst in the liquid phase heat treatment.

The amount of catalyst used in the liquid phase process may be varied between wide limits, for instance between 0.1 and 10% by weight based on the weight of phenol. The temperatures which may be used in the liquid phase treatment will normally lie in the range 40° to 182° C., that is between the melting-point and boiling point of pure phenol at atmospheric pressure. Higher temperatures may be used if desired, for instance by operating the system under increased pressures. Reduced pressures may also be used. It is preferred to operate between about 100° and 182° C., at atmospheric pressure. If desired the treatment may be carried out in the presence of a suitable solvent for phenol for instance aromatic hydrocarbons such as cumene. The length of time over which the treatment may be applied may vary within wide limits. Periods of about 5 to 30 minutes have been found to be suitable, but longer or shorter periods may be used if desired. In general the longer times are used with the lower temperatures, and vice-versa. The liquid phase treatment may be carried out in a batchwise or continuous manner. In the former case the process is preferably carried out in a well agitated vessel to ensure mixing and efficient contacting of the earth with the liquid phenol. The treatment may be repeated if desired using a fresh sample of surface-active earth, in the case of highly contaminated phenols. Alternatively, the phenol may be made to flow over a fixed or moving bed of the surface-active earth.

After the phenol has been subjected to conditions which will cause the condensation of the aliphatic α-hydroxy carbonyl compound with phenol to form benzofurans, the phenol is separated from the benzofurans and from the other impurities which have been formed at the same time. This may be carried out in any suitable manner using batch or continuous distillation or extraction techniques, but it is preferred to subject the phenol to extractive distillation in the presence of water, whereby the benzofurans are removed as an overhead fraction, and the phenol is removed as an intermediate or bottom fraction. The extractive distillation is preferably carried out in a continuous manner, for instance by feeding a solution or mixture of the phenol and water continuously into a column up which a similar mixture is refluxing, removing the benzofurans overhead as an azeotrope with water containing not more than a minor proportion of the phenol, separating the overhead fraction into an aqueous phase and an organic phase, returning part or all of the aqueous phase to the still as reflux, withdrawing part or all of the organic phase, and removing aqueous phenol as an intermediate or bottom fraction. The aqueous phenol may be further treated, if desired, for the recovery of phenol substantially free from higher boiling materials in any suitable manner, preferably by fractional distillation. In one method the wet phenol fraction is first dehydrated, either continuously or in a batchwise manner, by distilling off the water as an azeotrope with some of the phenol, and the rest of the phenol is then taken off as an overhead fraction leaving higher boiling materials as residue. In an alternative method all of the phenol and water are removed together as overhead distillate.

The extractive distillation may also be carried out by feeding the dry phenol continuously into a column up which a mixture of phenol and water is refluxing, removing the benzofurans overhead as a water azeotrope, returning substantially all of the water as reflux, and withdrawing dry phenol as an intermediate or bottom fraction. The dry phenol may, if desired, be subjected to a further fractional distillation step to separate it from higher boiling materials.

The following examples are given further to illustrate the process of the invention. In the examples the presence of hydroxy acetone was ascertained by the preparation of an osazone with 2,4-dinitrophenylhydrazine, and 2-methylbenzofuran was estimated by gas phase chromatography and/or by spectroscopic methods. In the samples colour measurements were made in a Lovibond Tintometer, using a 1 cm. cell.

EXAMPLE 1

A crude concentrate of 75% cumene hydroperoxide, obtained by the oxidation of cumene followed by the removal of the unreacted hydrocarbons by flash distillation was decomposed in the presence of 0.4% of concentrated sulphuric acid at 85° C. The final product was neutralised and distilled to give a lower fraction comprising acetone, water and a fraction comprising crude phenol. The phenol fraction was found to contain about 0.35% of hydroxyacetone.

The phenol fraction was first subjected to a process of hydro-extractive distillation to remove all water-strippable material, after which it was dehydrated and distilled, the first fraction of about 10% being discarded. The main phenol fraction passed the B.S.S. specification for pure phenol, but it was found still to contain 0.02% of hydroxyacetone and 70 p.p.m. of 2-methylbenzofuran. On chlorination of a sample of this phenol to the monochlorphenol an objectionable red colour (70 red Lovibond units) was formed.

The phenol was then passed in the vapour phase over alumina at 360° C. at a rate of 1 kg./hr./litre catalyst volume. The resulting product was found to contain 290 p.p.m. of 2-methylbenzofuran, corresponding to a chlorination colour of 290 red Lovibond units, but not hydroxyacetone. This product was treated for the removal of the 2-methylbenzofuran by a straight forward extractive distillation step in the presence of water, by refluxing the phenol through a 40-plate Oldershaw column with 20% by weight of water, followed by dehydration and distillation. The so-treated phenol had a chlorination colour of 0.5 red Lovibond units.

EXAMPLE 2

A crude concentrate of 75% cumene hydroperoxide, obtained from the oxidation of cumene followed by the removal of the unreacted hydrocarbons by flash distillation, was decomposed as described in Example 1, and the product was distilled to give a crude phenol fraction, containing about 0.36% hydroxyacetone, but less than 1 p.p.m. of 2-methyl-benzofuran.

After standing for several months in metal containers the phenol fraction was found to contain about 300 p.p.m. of 2-methyl-benzofuran, and to have a chlorination colour of 300 red Lovibond units. This phenol was treated by passing over a fuller's earth (Grade 3H2, marketed by The Fullers' Earth Union Limited) in the vapour phase at 190–194° C. The product contained over 1000 p.p.m. of 2-methyl-benzofuran, which was then removed by extractive distillation in the presence of water as described in Example 1. After dehydration and distillation the final product had a chlorination colour of 0.1 red Lovibond units.

EXAMPLE 3

A sample of phenol obtained by the oxidation of cumene and the decomposition of the resulting hydroperoxide, was extractively distilled in the presence of water, dehydrated and distilled to give a product which had an intense red colour on sulphonation (absorbing at 5040 A.) which was not due to the presence of either hydroxyacetone (5140 A.) or 2-methyl-benzofuran (4860 A.).

A sample of this phenol was treated by a process for converting hydroxyacetone into 2-methyl-benzofuran, by vapour phase heat-treatment over a fuller's earth catalyst (Grade 249SW. Fullers' Earth Union Limited) at 192–

194° and was subsequently subjected to extractive distillation in the presence of water followed by fractionation. On sulphonation of the resulting phenol, the product had a colour which was ten times less intense than the original sulphonation colour, and was no longer objectionable.

EXAMPLE 4

A sample of phenol, produced by the decomposition of cumene hydroperoxide, was found to have a Lovibond colour index, on chlorination under standard conditions to the monochlorphenol stage, of 72 red units. The phenol was vapourised into a glass tube containing a pre-heating section packed with porcelain beads and a reacting section packed with 225 mls. of 8–20 mesh alumina, which had been pre-treated by heating to 900° C. for 7 hours. The phenol was fed in at a rate of 90 to 110 g./hr. and the alumina-packed section of the tube was kept at 360–370° C.

The heat treated phenol was a dark brown colour and on chlorination to the monochlorphenol stage was found to have a Lovibond colour index of about 140 red units. Thus the heat treatment alone increased the amount of colour by a factor of about 2.

The heat treated phenol (2000 g.) was refluxed up a 40-plate Oldershaw column with 500 g. of water to attain equilibrium on the plates, and then a two-phase fraction amounting to 40 g. was slowly distilled out. The kettle contents were then dehydrated by distillation of the water-phenol azeotrope up a 15-plate Oldershaw column, after which the dried phenol was distilled off overhead leaving higher boiling materials in the kettle. On chlorination this phenol had a Lovibond colour index of 0.4 red unit.

Thus, the combined steps of heat treatment over alumina at 350–370° C., hydro-extractive distillation, and recovery of the phenol from higher boiling materials, lowered the red colour by a factor of 180.

EXAMPLE 5

A further sample of the phenol used in Example 4 which had a Lovibond colour index on chlorination of 72 red units, was diluted with one quarter of its weight of water and heat treated in apparatus similar to that described in Example 4, the alumina packed section of the tube being kept at 360–370° C. and the feed rate being 80 g./hr. The heat-treated aqueous phenol was a dark green fluorescent liquid. This phenol was subjected to a hydro-extractive distillation, dehydration and distillation as described in Example 4.

On chlorination the final product phenol had a Lovibond colour index of less than 0.1 red unit.

Thus, heat treatment of phenol in the presence of steam over alumina at 360–370° C. followed by hydro-extractive distillation, dehydration and distillation lowered the red colour by a factor of over 700.

EXAMPLE 6

A further sample of the phenol used in Example 4 was passed through the heat treatment apparatus of Example 4 at a rate of 80 to 120 g./hr. and at a temperature of 230° C. This phenol was then refluxed in a 50-plate column with 20% of added water, the aqueous distillate being returned continuously, but the oil phase of the distillate being retained in a trap at the top of the column. Subsequently, the wet phenol was dehydrated in the same column by the removal of both the aqueous and oil distillates. The head of the column was then changed to enable the phenol to be taken off overhead, and the phenol was finally distilled over at a very low reflux ratio.

The final pure phenol on chlorination had a Lovibond colour index of less than 0.1 red unit.

EXAMPLE 7

A sample of cumene-process phenol which had a chlorination colour index of 72 red units, was heat treated in apparatus similar to that described in Example 4 packed entirely with plain porcelain beads at a temperature of 260–290° C. The phenol was fed in at a rate of 200 g./hr. The heat treated phenol was submitted to hydro-extractive distillation, dehydration and distillation as described in Example 4, and on chlorination this phenol had a Lovibond colour index of 2.5 red units.

By way of comparison with this example, when a sample of the same phenol was submitted to the same treatment but omitting the heat treatment step, the product had a colour index of 16 red units.

EXAMPLE 8

A further sample of the phenol used in Example 7 was passed through 1.8 litres of Grade $3H_2$, 8–20 mesh, acid activated fuller's earth at a rate of approximately 600 g./hr. and an average temperature of 195° C.

After working up by hydro-extractive distillation, dehydration and distillation as described in Example 4, this phenol had a chlorination colour index of less than 0.5 red unit.

EXAMPLE 9

A sample of phenol, produced by the decomposition of cumene hydroperoxide, was found to have a colour index on chlorination under standard conditions to the monochlorphenol stage, of 72 red units, and a colour index on sulphonation under standard conditions of 80 red units. The phenol was shaken at the boiling point (182° C.) with 5% by weight of an acid fuller's earth (Grade SW 237) for ten minutes. The fuller's earth was filtered off and the filtered phenol was refluxed through a 40-plate Oldershaw column with 20% by weight of water after which a small quantity of distillate was taken off at a high reflux ratio. The aqueous phenol obtained from the base of this column was dehydrated by distillation of the water/phenol azeotrope through a 20-plate Oldershaw column, after which the dried phenol was distilled off overhead leaving the higher boiling materials in the kettle. On chlorination under the standard conditions to the monochlorphenol stage, this phenol had a colour index of 0.5 red unit, and on sulphonation under the standard conditions a colour index of 2.8 red units.

EXAMPLE 10

The process described in Example 9 was repeated using an alkaline fuller's earth (Fulbent 182). The product phenol had a chlorination colour index of 1 red unit, and a sulphonation colour index of 4.3 red units.

EXAMPLE 11

The process described in Example 9 was repeated on a different sample of phenol produced by the decomposition of cumene hydroperoxide. The untreated phenol had a chlorination colour index of 16 red units. After treatment according to the process of the present invention the chlorination colour index of the phenol was 0.2 red unit.

EXAMPLE 12

The process described in Example 9 was repeated on the same sample of phenol, except that the phenol was contacted with the fuller's earth at a temperature of 45–50° C., and for a period of 30 minutes. After this treatment the phenol was subjected to hydro-extractive distillation, dehydration and distillation as described in Example 9. The chlorination colour index of the final product was 6.4 red units.

EXAMPLE 13

A crude phenol produced by the decomposition of cumene hydroperoxide, and containing about 3.4% of hydrocarbons, mainly cumene and α-methylstyrene, when purified by extractive distillation followed by dehydration and distillation only, had a chlorination colour index of 15 red units. A sample of this crude phenol was refluxed at 155° C. for ten minutes with 5% by weight of an acid fuller's earth (Grade SW 237). The phenol was then subjected to hydro-extractive distillation, dehydration and distillation as described in Example 9. The final product phenol had a chlorination colour index of about one red unit.

EXAMPLE 14

A phenol prepared by the cleavage of cumene hydroperoxide in methyl ethyl ketone as solvent was found to contain 6130 p.p.m. of acetyl methyl carbinol (acetoin), and on chlorination to the monochlorphenol stage had a Lovibond colour index of 230 red units.

After refluxing this phenol with 5% by weight of fuller's earth for 30 minutes, the treated phenol was found to contain 2600 p.p.m. of 2,3-dimethyl benzofuran, identified by its peak on a gas phase chromatogram, its mass spectrum and its spectral characteristics in the U.V. and I.R. On chlorination to the mono-chlorphenol stage the treated phenol had a Lovibond colour index of 1550 red units.

After being submitted to an extractive distillation in the presence of water the phenol was found to contain substantially no benzofuran, and after a further distillation step the distillate gave substantially no red colour on chlorination.

EXAMPLE 15

A sample of phenol produced by the decomposition of cumene hydroperoxide, when chlorinated to the monochloro stage, had a red colour of about 92 red Lovibond units. The phenol was refluxed for 30 minutes at atmospheric pressure with 5% by weight of an acid fuller's earth (Grade 237SW). The earth was then filtered off from the phenol. A sample of the treated phenol was chlorinated to the monochloro stage, when a red colour developed having a Lovibond colour index of 1140 red units. 18% by weight of water and 1% by weight of cumene were added to the treated phenol, and the mixture was subjected to a continuous extractive distillation in a 45 tray glass Oldershaw column, the head temperature being maintained at 98–99° C. and the kettle temperature at 105–106° C., the feed tray being 30 trays above the kettle. The head product was condensed, when it separated into two layers. The upper (hydrocarbon) layer was removed as product and the lower (aqueous) layer was returned as reflux to the column. A sample of the kettle product was collected and dehydrated and distilled by batch distillation in a 15 tray glass Oldershaw column. The main dry phenol fraction had a red colour after chlorination to the monochlorophenol stage having a Lovibond colour index of less than 1 red unit.

EXAMPLE 16

A sample of crude phenol, as used in Example 13, was passed in the vapour phase at a rate of 200 millilitres (liquid)/hour over 425 millilitres of granular alumina in a glass tube heated to 205–210° C. The condensed product was diluted with 18% by weight of water and given a continuous hydroextractive distillation followed by a batch dehydration and distillation as in Example 15. The main dry phenol fraction had a red colour after chlorination to the monochloro stage of approximately 2 red Lovibond units.

EXAMPLE 17

A sample of crude phenol, as used in Example 13, was pumped at a rate of 200 millilitres per hour in the liquid phase through a steel tower containing 250 millilitres of silica/alumina cracking catalyst maintained at 190° C., a relief valve on the exit being set at 80 p.s.i.g. to maintain the phenol in the liquid phase. The heat treated product was diluted with 18% of water and given a continuous extractive distillation, followed by a batch dehydration and distillation as in Example 15. The main dry phenol fraction had only a weak red colour when chlorinated under standard conditions to the monochloro stage, equivalent to about 0.6 red Lovibond unit.

By way of comparison with the above examples the following experiments are given to illustrate the effect of heat treatment and hydro-extractive distillation carried out separately.

Experiment A

A further sample of the phenol used in Example 4 was diluted with 20% of its weight of water. This enabled it to be handled as a liquid at ordinary temperatures, and it was heat treated in the apparatus described in Example 4, the feed rate being 80 g./hr. and the alumina packed section of the tube being kept at 360–370° C. The heat treated phenol was a dark green fluorescent liquid, and after dehydration and distillation (i.e. with no hydro-extractive distillation) the distilled phenol was colourless, but had a chlorination colour of 52 red Lovibond units.

Thus, heat treatment followed by distillation reduced the red colour by a factor of 1.4 only.

Experiment B

A further sample of the phenol used in Example 4 (2000 g.) was refluxed up a 40-plate Oldershaw column with 500 g. of water for 20 hours to attain equilibrium on the plates, and then a two-phase fraction amount to 40 g. was slowly distilled out. The kettle contents were then dehydrated by distillation of the water/phenol azeotrope up a 15-plate Oldershaw column, followed by a distillation of the dried phenol overhead.

On chlorination this phenol had a Lovibond colour index of 16 red units. Thus the step of hydro-extractive distillation not preceded by heat treatment lowered the red colour by a factor of only 4.5.

Experiment C

A sample of the phenol used in Example 9 was refluxed at 182° C. with 5% by weight of fuller's earth (Grade SW 237) for ten minutes. The fuller's earth was filtered off, and the phenol was then fractionated at atmospheric pressure in a 40-plate Oldershaw column. After 40% of the phenol had been distilled off overhead, the chlorination colour index of the distillate then distilling was 64 red units.

I claim:

1. The process for the purification of the phenol in a cumene hydroperoxide decomposition reaction product which comprises subjecting said decomposition reaction product to fractional distillation to remove most of the lower boiling materials comprising acetone, cumene and α-methylstyrene and most of the higher boiling materials comprising acetophenone and phenyl dimethyl carbinol, and then contacting any phenol material which has been subjected to such distillation, but which is still impure in that it contains color forming impurities comprising α-hydroxycarbonyl compounds, at a temperature between 40° and 400° C. with a catalyst selected from the group consisting of mineral acids, strong organic acids and solid surface-active catalysts until said α-hydroxycarbonyl compounds have condensed with phenol to form substituted benzofurans, and extractively distilling the treated phenol material in the presence of water until the substituted benzofurans have been removed from the phenol material as an overhead fraction.

2. The process as claimed in claim 1 wherein the extractive distillation is carried out in a continuous manner.

3. The process as claimed in claim 1 wherein the impure phenol is contacted with the catalyst at a temperature between 100° and 400° C.

4. The process as claimed in claim 1 wherein the impure phenol is contacted in the liquid phase with a montmorillonite earth.

5. The process as claimed in claim 4 wherein the impure phenol is contacted with the montmorillonite earth at a temperature between 100 and 182° C. at atmospheric pressure.

6. The process as claimed in claim 1 wherein the benzofurans are removed overhead as an azeotrope with water containing not more than a minor proportion of the phenol, the overhead fraction is separated into an aqueous phase and an organic phase, at least part of the aqueous phase is returned to the still as reflux, at least part of the organic phase is withdrawn, and aqueous phenol is removed as a separate fraction.

7. The process as claimed in claim 6 wherein the aqueous phenol is fractionally distilled to recover dry phenol free from higher boiling materials.

8. The process as claimed in claim 1 wherein the extractive distillation is carried out by feeding the dry phenol continuously into a column up which a mixture of phenol and water is refluxing, removing the benzofurans overhead as a water azeotrope, returning substantially all of the phenol to the column as reflux, and withdrawing dry phenol as a separate fraction.

9. The process as claimed in claim 8 wherein the dry phenol is subsequently subjected to a further fractional distillation step to separate it from higher boiling materials.

References Cited in the file of this patent

UNITED STATES PATENTS

| | | |
|---|---|---|
| 2,228,366 | Rumscheidt et al. | Jan. 14, 1941 |
| 2,737,480 | Adams et al. | Mar. 6, 1956 |
| 2,744,144 | Sheffield | May 1, 1956 |
| 2,757,209 | Joris | July 31, 1956 |
| 2,824,048 | Hupe et al. | Feb. 18, 1958 |
| 2,824,049 | Maincon et al. | Feb. 18, 1958 |

FOREIGN PATENTS

| | | |
|---|---|---|
| 1,151,059 | France | Aug. 19, 1957 |